United States Patent
Yuyama et al.

(10) Patent No.: US 7,806,644 B2
(45) Date of Patent: Oct. 5, 2010

(54) TRAY DISCHARGE DEVICE

(75) Inventors: Shoji Yuyama, Toyonaka (JP); Akitomi Kohama, Toyonaka (JP); Tatsuaki Kunimoto, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 813 days.

(21) Appl. No.: 11/587,537

(22) PCT Filed: Apr. 27, 2005

(86) PCT No.: PCT/JP2005/008025

§ 371 (c)(1),
(2), (4) Date: May 11, 2007

(87) PCT Pub. No.: WO2005/105621

PCT Pub. Date: Nov. 10, 2005

(65) Prior Publication Data

US 2008/0014062 A1    Jan. 17, 2008

(30) Foreign Application Priority Data

Apr. 30, 2004  (JP) .............................. 2004-136529

(51) Int. Cl.
*B65G 67/04* (2006.01)

(52) U.S. Cl. ............................... 414/331.06; 414/331.1; 414/331.11; 414/331.13; 414/400; 414/401

(58) Field of Classification Search ............ 414/331.06, 414/331.1, 331.11, 331.13, 401, 396, 400; 198/435

See application file for complete search history.

(56) References Cited

U.S. PATENT DOCUMENTS

| | | | | |
|---|---|---|---|---|
| 1,565,984 A | * | 12/1925 | Brockenbrough | 414/331.11 |
| 3,637,095 A | * | 1/1972 | Kampfer | 414/331.07 |
| 4,203,696 A | * | 5/1980 | Lindberg | 414/331.09 |
| 4,277,216 A | * | 7/1981 | Lindberg | 414/331.09 |
| 4,634,333 A | * | 1/1987 | Butterly et al. | 414/331.07 |
| 4,712,963 A | * | 12/1987 | Kondo | 198/346.1 |
| 4,787,799 A | * | 11/1988 | Platteschorre | 414/789.1 |
| 4,806,072 A | * | 2/1989 | Karashima | 414/800 |
| 5,007,785 A | * | 4/1991 | van der Schoot | 414/331.11 |
| 5,078,565 A | * | 1/1992 | Fritschi et al. | 414/331.08 |

(Continued)

FOREIGN PATENT DOCUMENTS

JP    2-62314    3/1990

(Continued)

*Primary Examiner*—James Keenan
(74) *Attorney, Agent, or Firm*—Wenderoth, Lind & Ponack, L.L.P.

(57) ABSTRACT

A tray discharge apparatus which is capable of automatically discharging and storing medicine-filled trays in carts and aligning the carts. The apparatus includes a cart standby portion (13) for putting a cart (8) transported from a cart supply line (48) on standby; and a tray supply portion (14) having a tray shift unit (21) for sequentially storing trays (7) in storage areas (46) of the cart transported from the cart standby portion. The tray supply portion is operable to align the carts with the stored trays relative to a tray discharge line (49) that is juxtaposed to the tray supply line. Also, a cart shift member (15) is provided for moving the cart to the tray supply portion from the cart standby portion.

4 Claims, 14 Drawing Sheets

U.S. PATENT DOCUMENTS

| | | | |
|---|---|---|---|
| 5,092,730 A * | 3/1992 | Neri | 414/331.04 |
| 5,437,537 A * | 8/1995 | Sweet et al. | 414/400 |
| 5,478,185 A * | 12/1995 | Kranz | 414/331.13 |
| RE35,555 E * | 7/1997 | Sjogren et al. | 414/397 |
| 6,056,496 A * | 5/2000 | Myers et al. | 414/398 |
| 6,997,666 B1 * | 2/2006 | Rodgers et al. | 414/331.06 |

FOREIGN PATENT DOCUMENTS

| | | |
|---|---|---|
| JP | 4-256626 | 9/1992 |
| JP | 8-73028 | 3/1996 |
| JP | 8-310625 | 11/1996 |
| JP | 2003-93450 | 4/2003 |

* cited by examiner

Fig.4
(a)
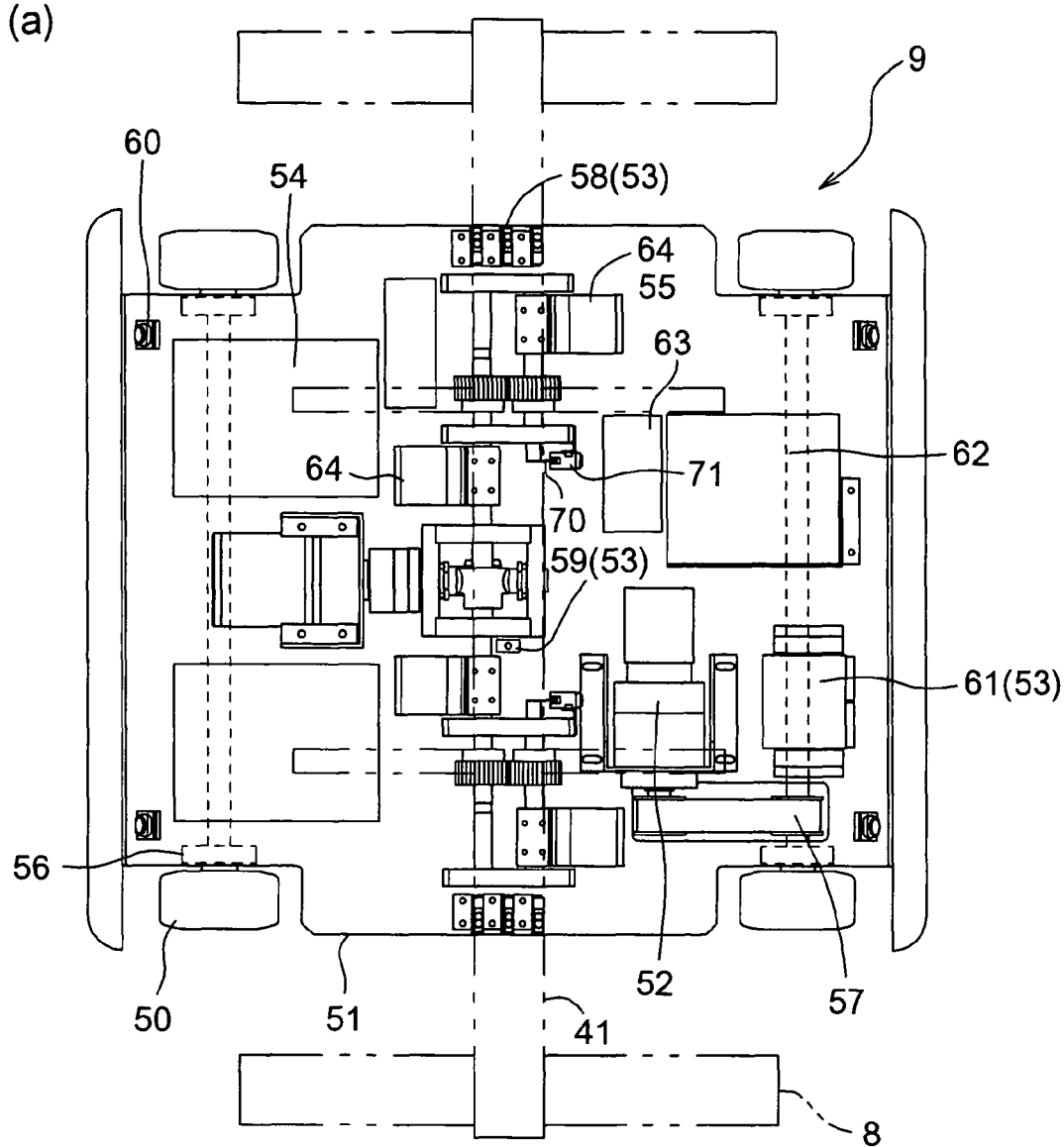
(b)
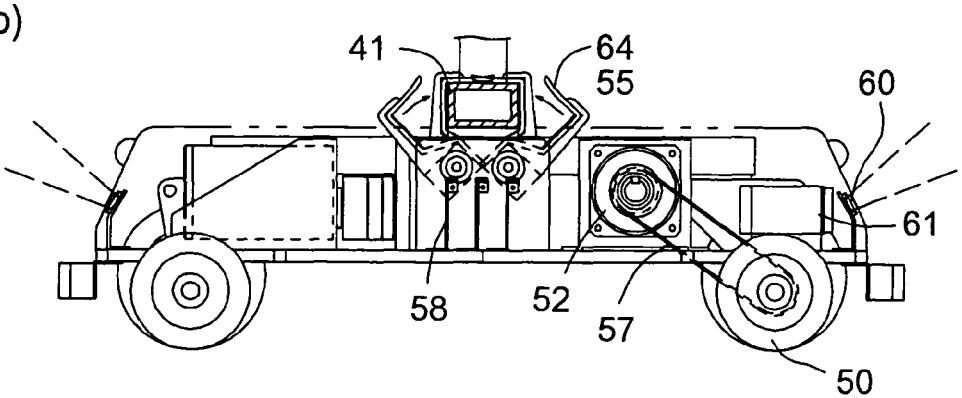

Fig.13
(a)
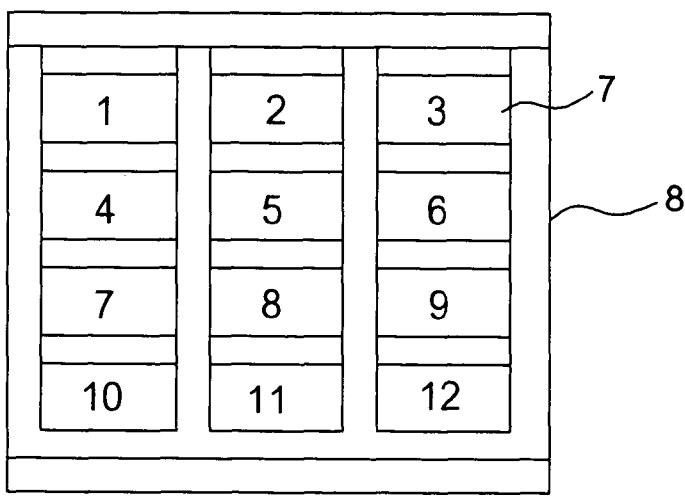
(b)
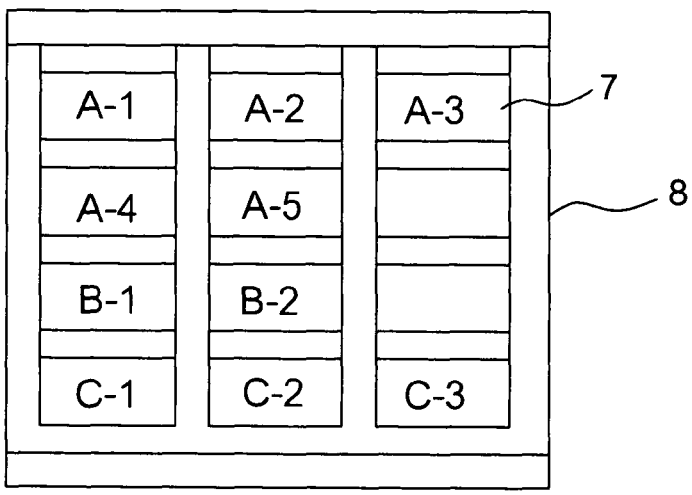
(c)
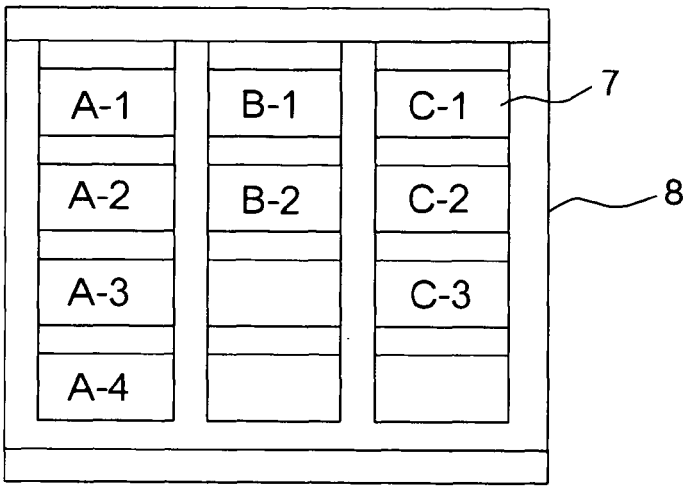

TRAY DISCHARGE DEVICE

BACKGROUND OF THE INVENTION

1. Technical Field

The present invention relates to a tray discharge apparatus for storing trays with medicine contained in each of the storage areas provided on empty cart.

2. Description of the Related Art

Conventionally, in the case of transporting medicine from a pharmacy department, medicine for one patient contained in a tray, which is automatically transported to a nurse station using a transport unit (see, for example, JP A 8-310625). As it is inefficient to transport the medicine separately from the nurse station to each patient's room, the trays are stored in a cart and the cart is transported.

However, work of storing a number of trays in the cart is very troublesome. As a construction in which the trays contained in the cart do not drop during transport by the cart is adopted, the trays are difficult to store in the cart. Thus, automatic storage of trays into carts has been needed, though no solution has been found.

SUMMARY OF THE INVENTION

It is an object of the present invention to provide a tray discharge apparatus which is capable of automatically discharging and storing medicine-containing trays in cart and aligning the carts.

The present invention provides a tray discharge apparatus as a means for solving the above-described problems. The tray discharge apparatus includes:

a cart standby portion for putting a cart transported from a cart supply line on standby;

a tray supply portion having a tray shift unit for sequentially storing trays with medicine contained in each of storage areas of the cart transported from the cart standby portion, the tray supply portion aligning the carts with the trays stored against a tray discharge line juxtaposed with the tray supply line; and a cart shift member for moving the cart to the tray supply portion from the cart standby portion.

According to this construction, the empty carts are prepared on the cart supply line in advance and then put on standby in the standby portion. When an empty cart is moved to the tray supply portion by the cart shift member, the trays can be automatically stored in the storage areas of the cart by the tray shift unit. The cart with the trays stored thereon can be aligned on the cart discharge line.

Preferably, the tray supply portion is provided with an electromagnetic portion for attracting and positioning a cart that has been moved from the tray standby portion.

The apparatus further comprises a control portion which drives the cart shift member to move the cart to the tray supply portion from the cart standby portion and then magnetizes or demagnetizes the electromagnetic portion.

According to this construction, positional displacement of a cart, when storing the carts in the storage areas, can be surely prevented.

Preferably, the cart standby portion is provided with a guide portion which ascends when the cart is moved to the cart standby portion from the cart supply line and descends to guide the cart when the cart is moved to the tray supply portion from the cart standby portion.

According to this construction, the cart can be moved to the tray supply portion from the cart standby portion without causing position displacement. Also, during this movement, the next cart is reliably prevented from entering the cart standby portion.

Preferably, the tray supply portion is provided with a guide portion which descends to guide the cart when the cart is moved to the tray supply portion from the cart standby portion and ascends when the cart is moved to the cart discharge line from the cart supply portion.

According to this construction, the cart can be moved to the tray supply portion from the cart standby portion without causing position displacement. It is also possible to prevent position displacement of the cart when the trays are stored in the storage areas.

According to the present invention, the cart is initially put on standby in the cart standby portion and moved to the tray supply portion, thereby allowing the trays to be stored in the storage areas. Thus, it is possible to smoothly move the carts that are aligned on the cart supply line and align the cart with the trays stored on the cart discharge line. It is also possible to promote automation and improve efficiency of the work.

BRIEF DESCRIPTION OF THE DRAWINGS

FIG. 4(a) is a plan view showing an internal construction of a tray transport unit and FIG. 4(b) is a front view of FIG. 4(a);

FIGS. 13(a), (b), (c) are front views showing examples of the trays stored in the cart;

EXPLANATION OF THE REFERENCE NUMERALS

Figure 1:
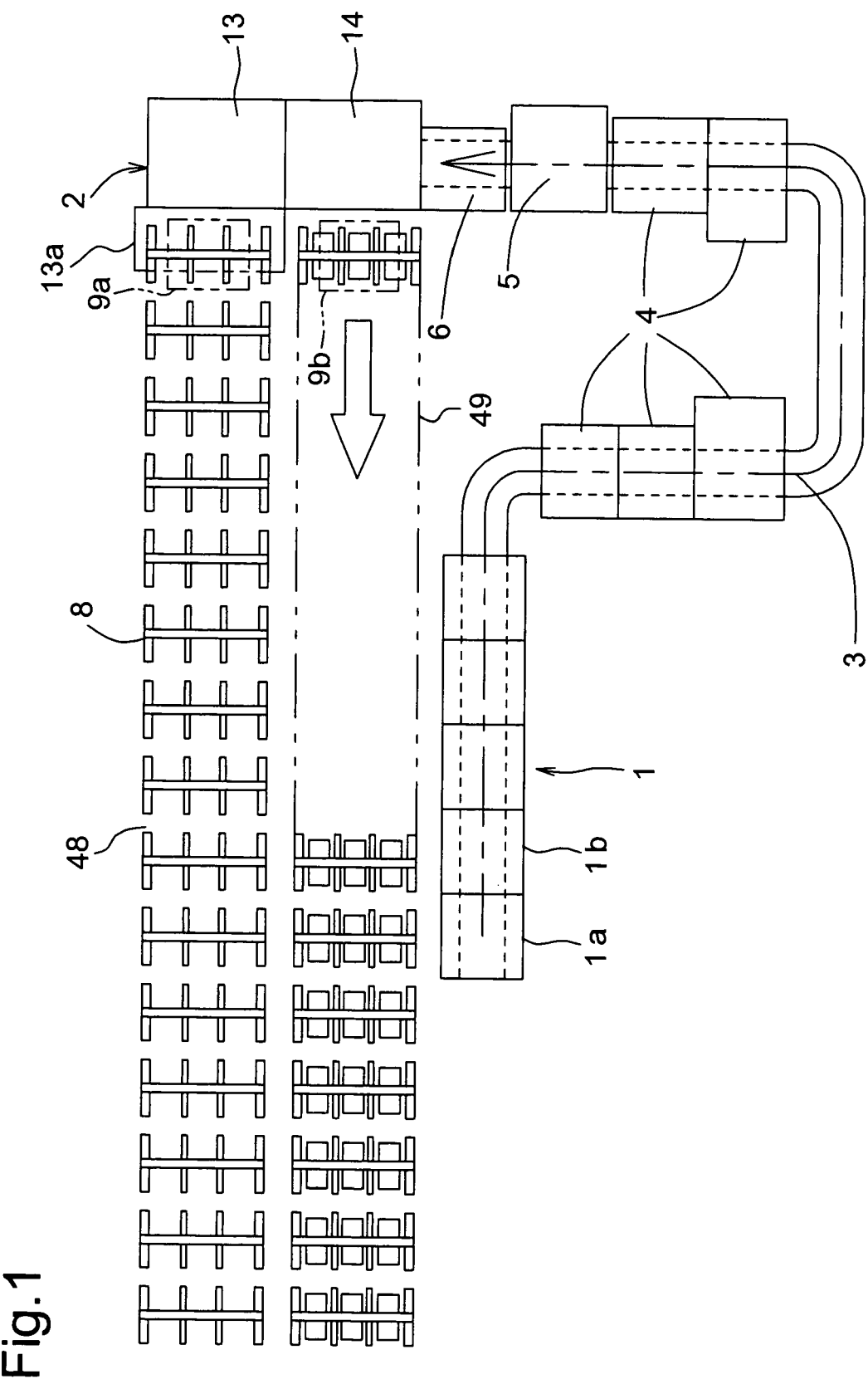
FIG. 1 is a general view showing an outline of medicine supply system according to an embodiment of the present invention.

1 Supply lifter
2 Tray discharge unit
3 Tray transport line
4 Medicine dispensing unit
5 card rewriting unit
6 Stack lifter
7 Tray
8 Cart 9 Cart transport unit
10 Control unit
11 Flange portion
12 Identification card
13 Cart standby portion
14 Tray supply portion
15 Cart shift member
16 First optical communication portion
17 First guide member
18 Elevation motor
19 Gear
20 Guide piece
21 Tray shift unit
22 Vertical rail
23 Horizontal rail
24 Tray holding member
25 Arm portion
26 Pushing portion
27 Second optical communication portion
28 Electromagnet portion
29 Second guide member
30 Guide roller
31 Guide cover
32 Driving belt
33 Slider
34 Pusher
35 Pulley
36 Gear
37 Shift motor
38 Support panel
39 Leg portion
40 Upper connection portion
41 Lower connection portion
42 Grip
43 Support portion
44 Caster
45 Guide groove
46 Storage area
48 Cart supply line
49 Cart discharge line
50 Wheel
51 Frame
52 Drive motor
53 Detection member
54 Control substrate
55 Grip member
56 Bearing member
57 Drive transmission belt
58 Cart detection sensor
59 Position deviation detection sensor
60 Detection sensor
61 Third optical communication portion
62 Pulse driver
63 Signal converter
64 Grip arm
65 Drive shaft
66 Driven shaft
67 Drive gear
68 Driven gear
69 Support table
70 Sensor dog
71 Position detection sensor
72 Current collecting arm
73 Slit
74 Power supply unit
75 Guide rail
76 Trolley
77 Cover
78 Server
79 Input unit

DESCRIPTION OF THE PREFERRED EMBODIMENTS

Hereinafter, embodiments of the present invention will be described with reference to the accompanying drawings.

Figure 2:
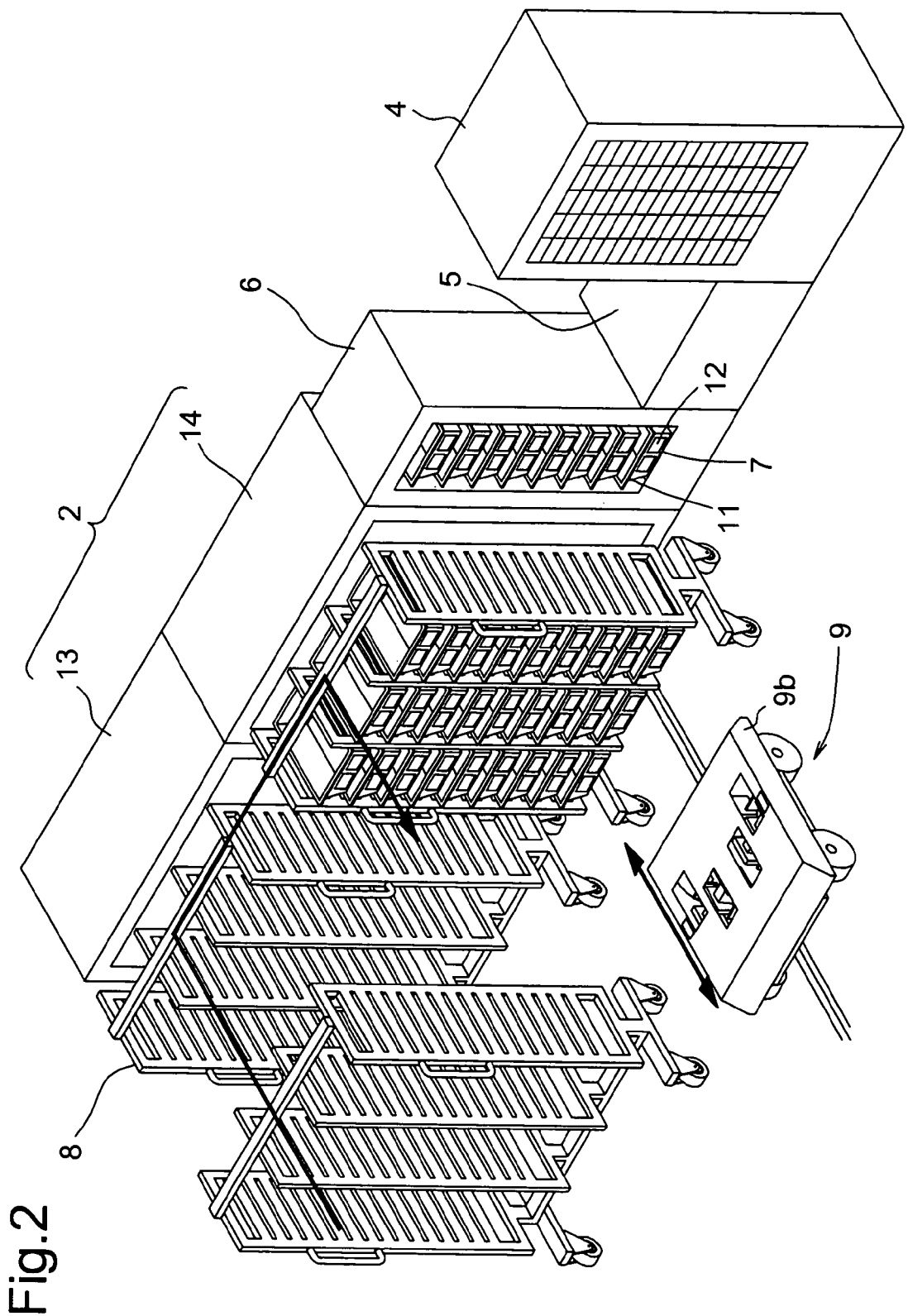
FIG. 2 is a perspective view showing a tray discharge unit of FIG. 1.
Figure 11:
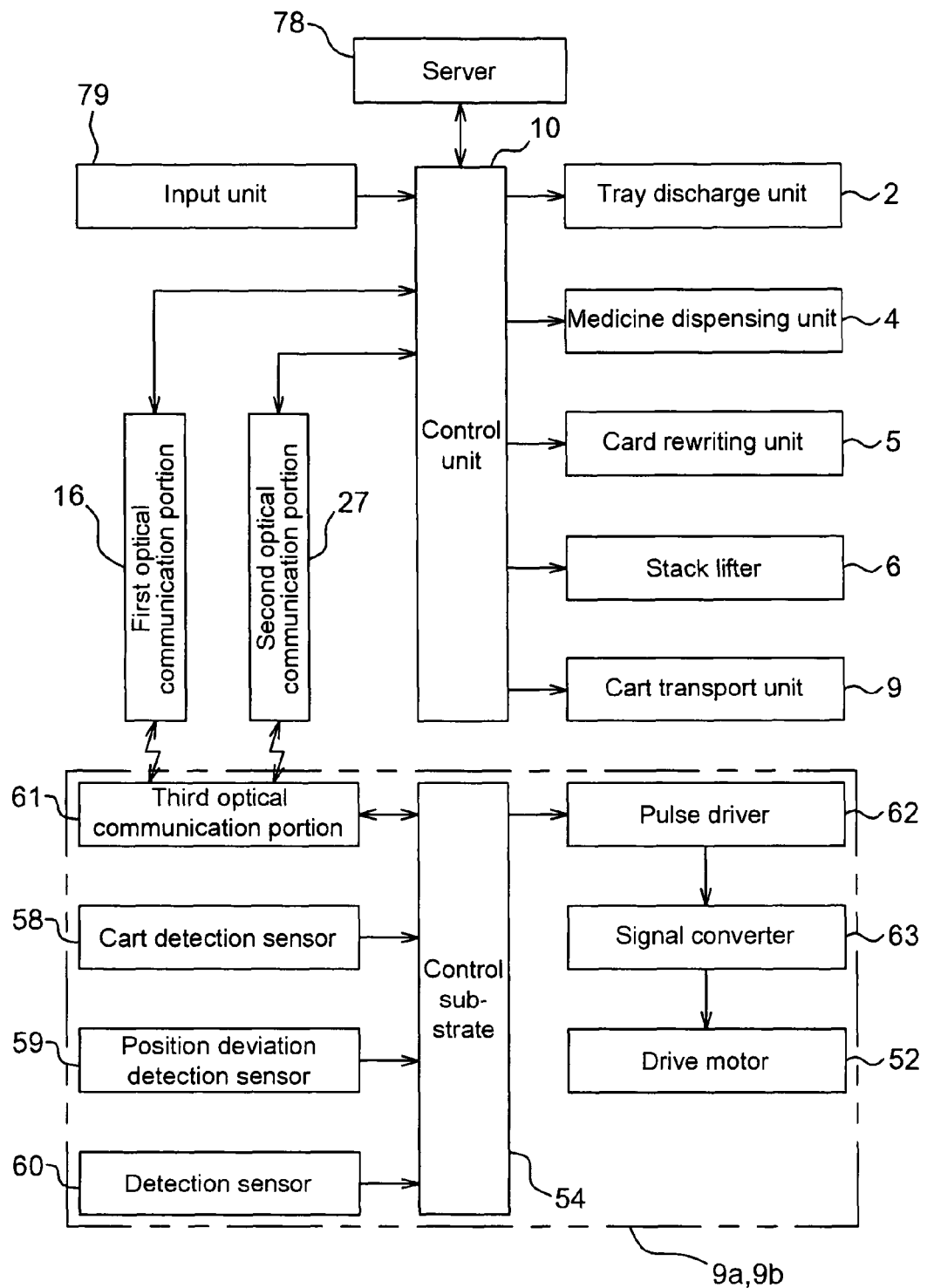
FIG. 11 is a block diagram showing a control unit of the medicine supply system according to the present invention.

FIG. 1 shows a medicine supply system according to an embodiment of the present invention. In the medicine supply system, a plurality of medicine dispensing units 4, card rewriting unit 5 and a stack lifter 6 are disposed on the way of a tray transport line 3 connecting a supply lifter and a tray discharge unit 2. As shown in FIG. 2, there is provided a cart transport unit 9 which transports empty carts 8 to the tray discharge unit 2 and transports the carts 8 with trays 7 stored thereon. As shown in FIG. 11, these members are controlled by a control unit 10.

Figure 3:
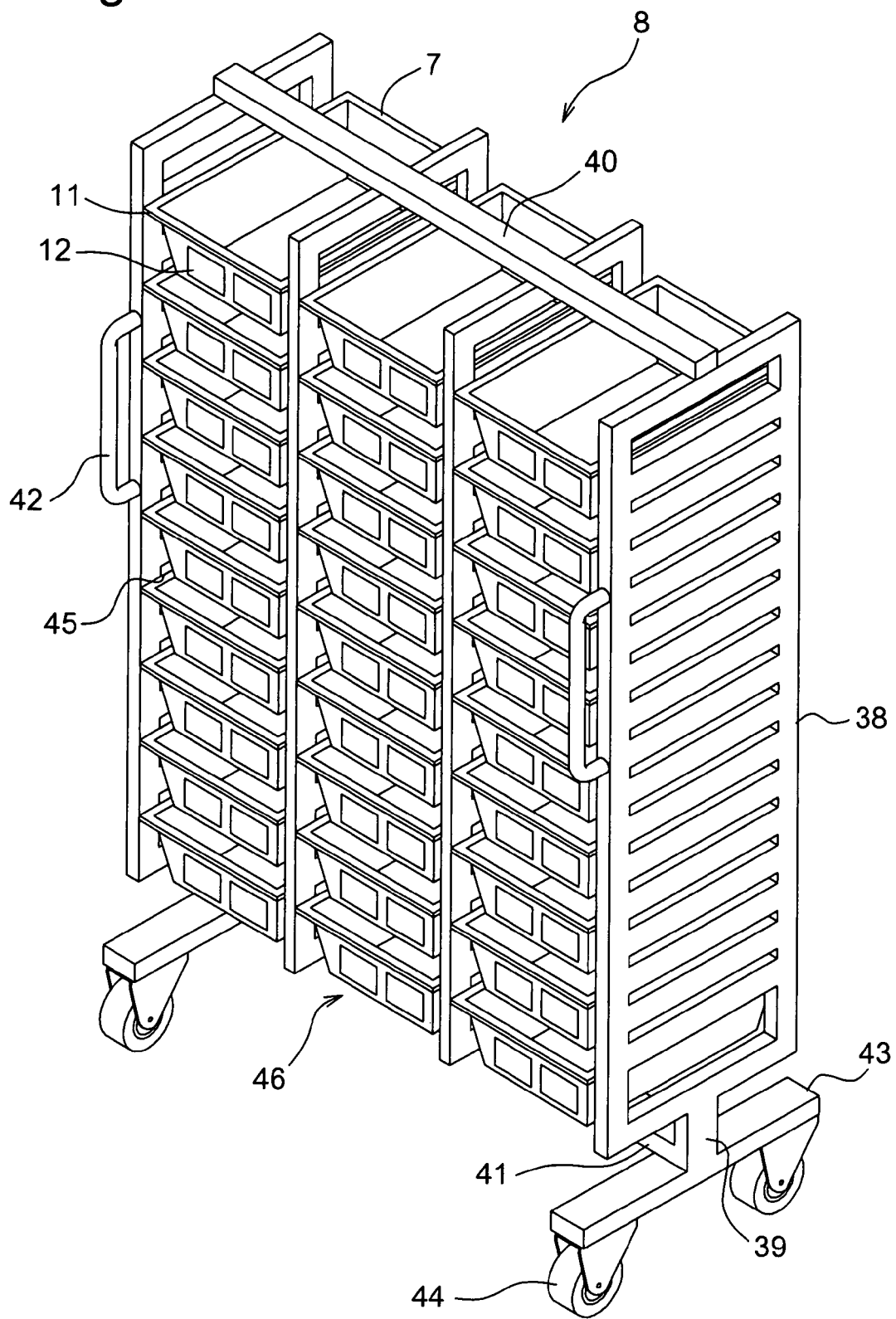
FIG. 3 is a perspective view of a cart with the trays stored therein.

The supply lifter 1 stores a plurality of trays 7 in a stacked state and sequentially discharges the plurality of trays one by one to the tray transport line 3. Each tray 7, as shown in FIG. 3, has a box shape with an open upper surface and a flange portion 11. On the side surface of the tray 7, an identification card 12 can be attached and detached. The identification card 12 may take the form of a Lueco type or a thermochromic type of rewrite card or such which is rewritable by heating the card to a predetermined temperature. Patient information and the like can be written on the identification card 12.

Figure 7:
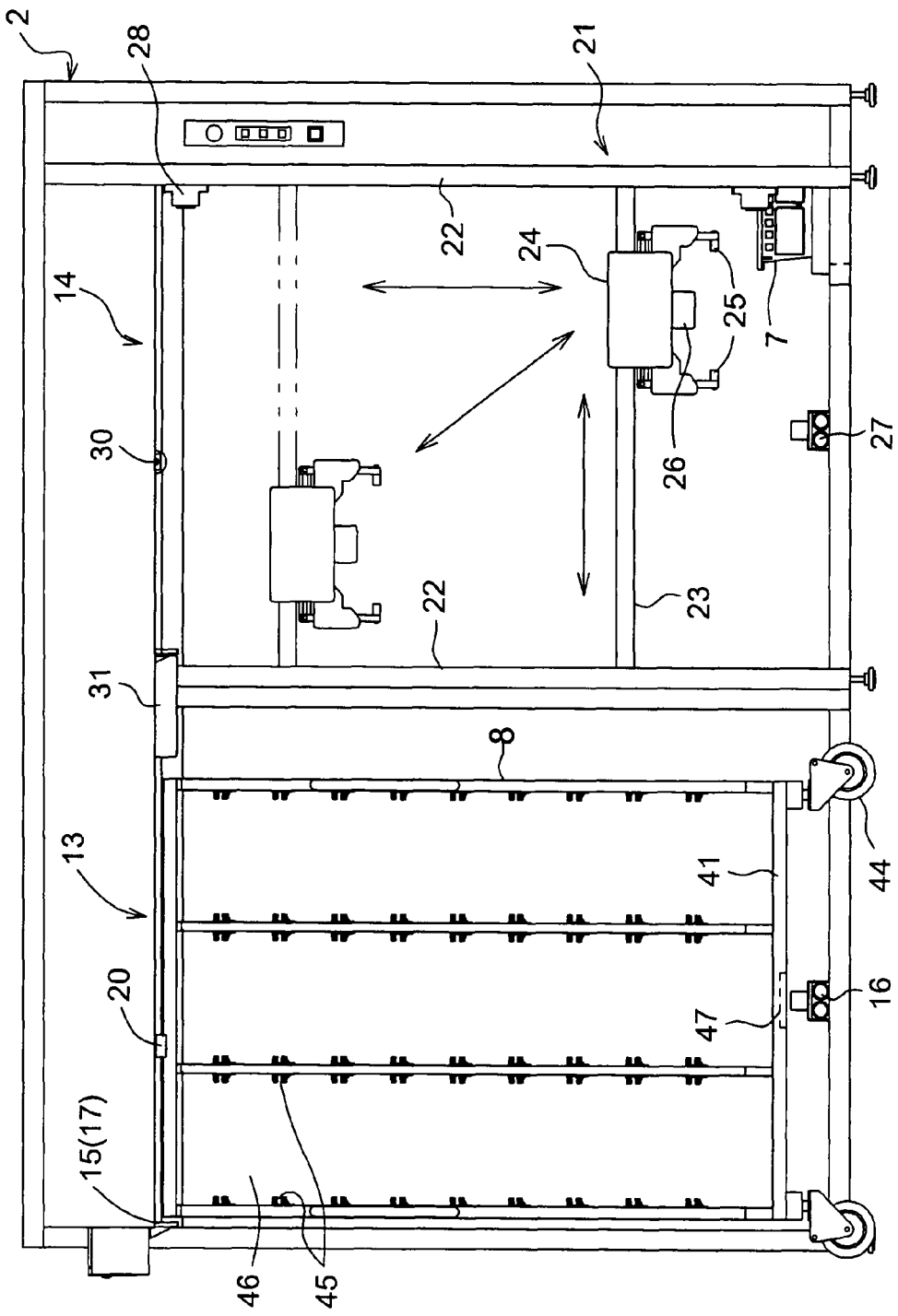
FIG. 7 is a front view of a tray discharge unit.

The tray discharge unit 2, as shown in FIGS. 2 and 7, comprises a cart standby portion 13 and a tray supply portion 14. The upper part of the tray discharge unit 2 is provided a cart shift member 15. The tray discharge unit 2 sequentially stores the trays 7 in the empty cart 8.

Figure 9:
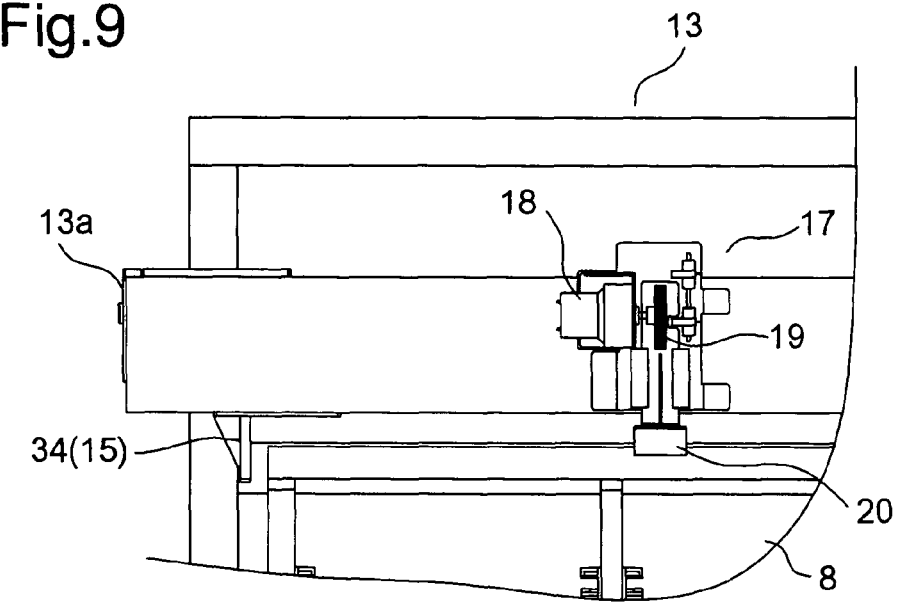
FIG. 9 is an enlarged view showing a part close to a first guide member of FIG. 7.

The cart standby portion 13, as shown in FIG. 7, comprises plate-like members assembled in a rectangular frame and ensures a space for putting the cart 8 on standby at a position along the tray discharge unit 13 in order to quickly adequately shift the cart 8 to next tray supply unit 14. At the middle portion of the lower plate of the cart standby portion 13, a first optical communication portion 16 is provided. The first optical communication portion 16 conducts transmission and receipt of data with a third optical communication portion 61 provided in the cart transport unit 9 which will be described hereinafter. As shown in FIG. 9, at the middle portion of an overhanging portion 13a of the cart standby portion 13 is provided a first guide member 17. The guide member 17 moves a guide piece 20 up and down via a gear 19 by driving an elevation motor. When moving up, the guide piece 20 enables the cart 8 to enter into the cart standby portion 13 from the cart supply line 48. When moving down, the guide piece 20 guides the cart 8, which moves from the cart standby portion 13, to the tray supply portion 14 and prevents the next empty cart 8 from entering.

The tray supply portion 14, as shown in FIG. 7, has the shape of a rectangular frame and is provided with a tray transfer apparatus 21. The tray transfer apparatus 21 has a horizontal rail 23 that is slidably provided in a vertical direction on vertical rails 22 attached on the plate-like members on both sides of the tray supply portion and a tray holding member 24 is movably provided in a horizontal direction on the horizontal rail 23. The tray holding member 24 comprises arm portions 25 for holding the flange portions 11 of the tray 7 and a push portion 26 for pushing the tray 7, which is held by the arm portions 25, in a forward direction, i.e., toward the cart 8. The tray holding member 24 can move in both the X (horizontal)-direction and the Y (vertical) direction to store the tray 7 in an appropriate storage area 46.

Figure 10:
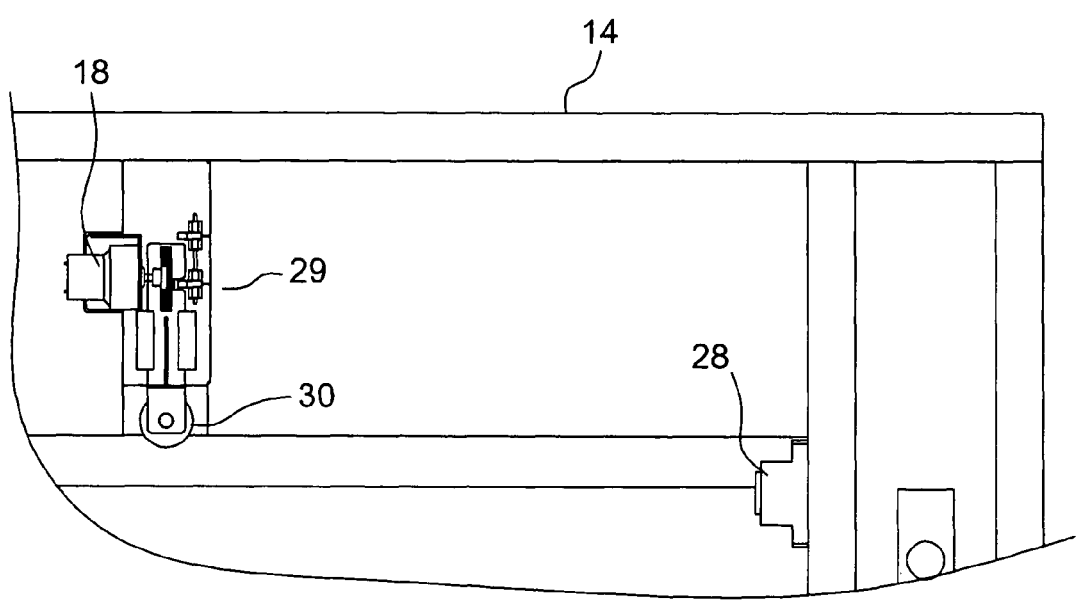
FIG. 10 is an enlarged view showing a part close to a second guide member of FIG. 7.

The tray supply portion 14 is provided with a second optical communication portion 27, which conducts transmission and reception of data with respect to a third optical communication portion 61 provided in the cart transfer apparatus 9 that will be described hereinafter. An electric magnet portion 28 is provided on an upper portion of a side plate of the tray supply portion 14. The electric magnet portion 28 is energized upon an empty cart 8 being transferred by the cart shift member 15 so that the cart 8 is attracted and positioned. This prevents positional displacement of the cart 8 when the trays are stored in the cart 8. Provided on the middle portion of the upper plate of the tray supply portion 14, as shown in FIG. 10, is a second guide member 29 having the same construction as the first guide member 17. In the second guide member 29, a guide roller 30 is provided instead of the guide piece 20. The guide roller 30 descends to guide the cart 8 moving from the cart standby portion 13 to the tray supply portion 14 and ascends to enable the cart 8 to move from the tray supply portion 14 to the cart discharge line 49.

As shown in FIG. 7, a guide cover 31 is provided on the upper portion of the boundary between the cart standby portion 13 and the tray supply portion 14. The guide cover 31 has a substantially L-shape formed of a plate-like body extending from the horizontal direction to the vertically lower direction. The guide cover 31 prevents displacement of the position of the cart 8 when the cart 8 moves from the cart standby portion 13 to the tray supply portion 14.

Figure 8:
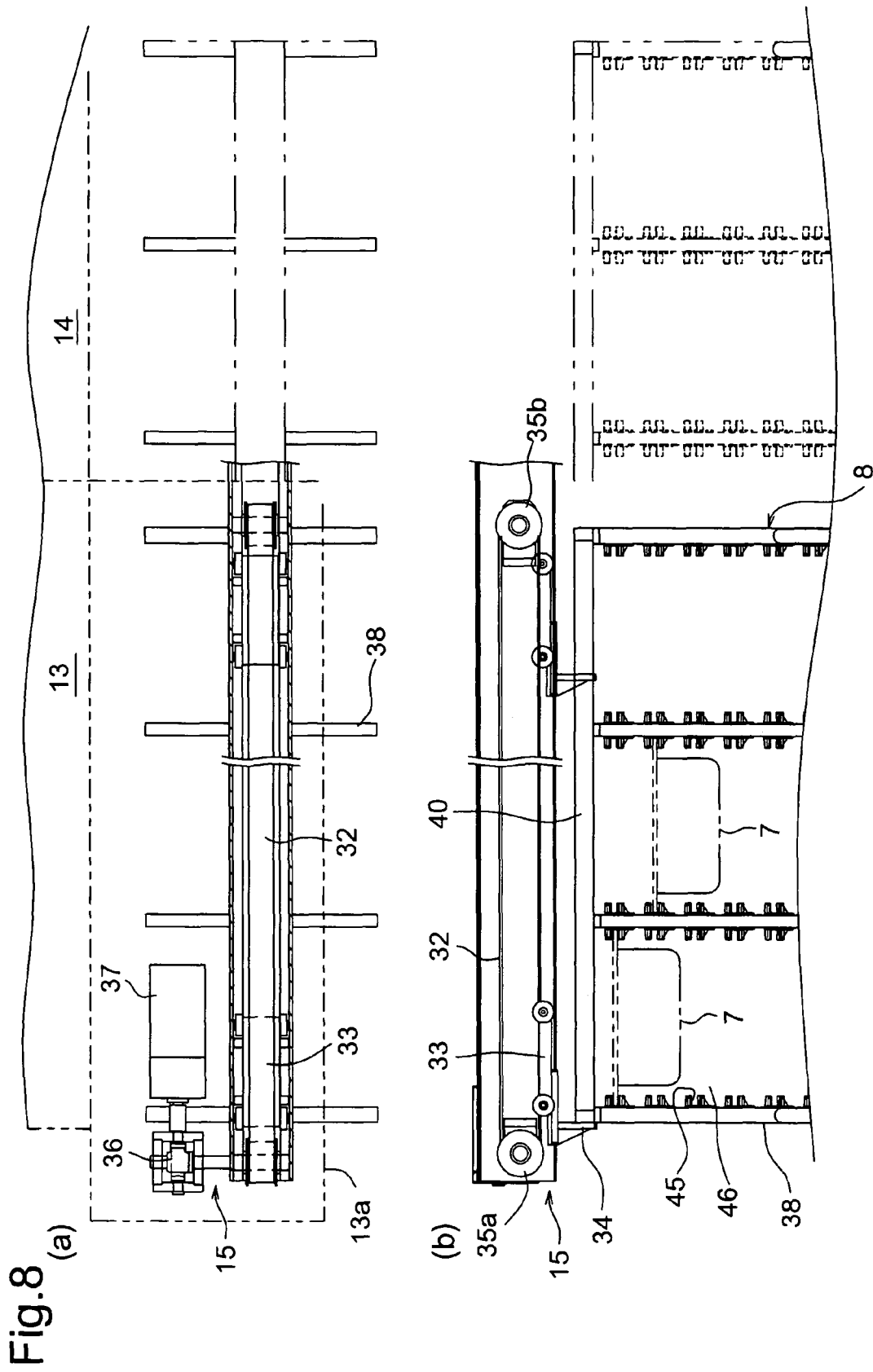
FIG. 8(a) is a plan view of FIG. 7
FIG. 8(b) is a front sectional view showing a part of FIG. 8(a)

The cart transfer member 15, as shown in FIG. 8, comprises a drive belt 32 provided on the upper portion of the cart standby portion 13 and the tray supply portion 14, a slider 33 fixed on the drive belt, and a pusher 34 extending downward from the slider 33. The belt 32 is engaged with pulleys 35a, 35b provided on both sides thereof. A drive power is transferred to one pulley 35a via a pair of gears 36 from the shaft of the transfer motor 37. The pusher 34 is arranged to push the one end surface of the empty cart 8, disposed in the cart standby portion 13, so as to transfer the cart to the tray supply portion 14.

Figure 12:
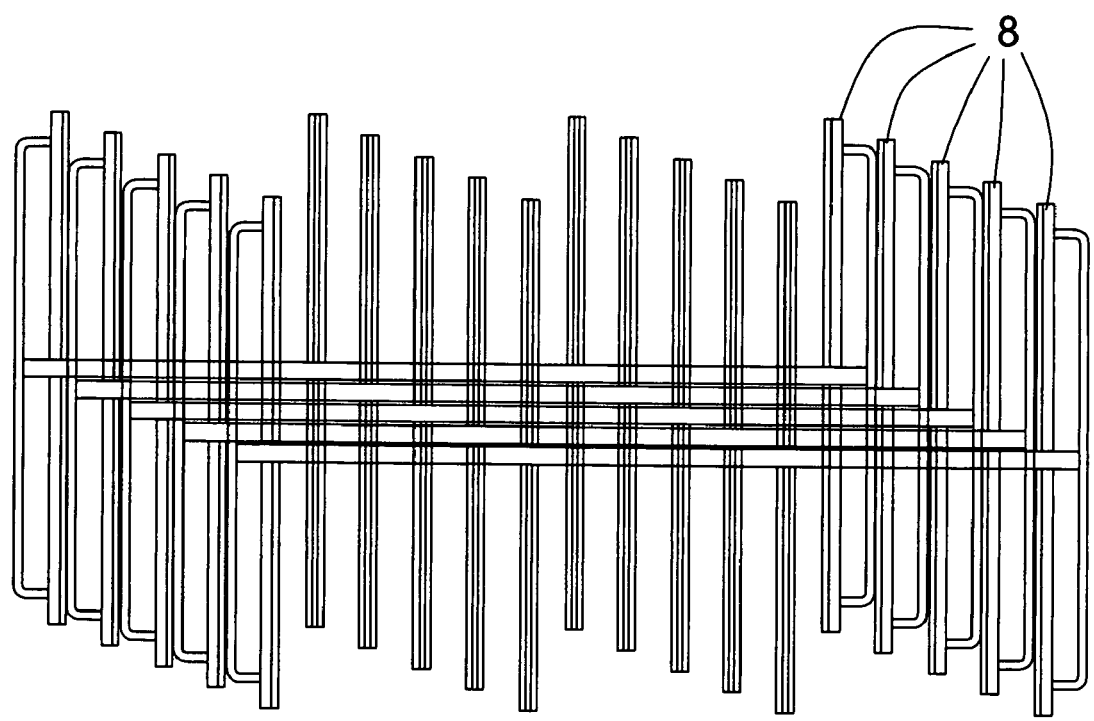
FIG. 12 is a plan view showing a state in which a plurality of carts is put together.

The cart 8, as shown in FIG. 3, is an integrated construction comprising four support panels 38 kept upright at predetermined intervals, an upper connection member 40 connecting each middle portion of upper ends of the support panels and a lower connection member 41 connecting each leg portion 39 that protrudes from the middle portions of lower ends of the support panels. In the support panels 38 positioned at both sides, grips 42 are provided respectively at the upper side edge portions and also casters 44 are provided respectively at both ends of a support portion 43 that extends from the lower end of the leg portion 39. Thus, holding the grips 42 allows the cart 8 to be freely moved. On the opposite surfaces of the support panels 38, guide grooves 45 are formed at predetermined intervals in a vertical direction. The opposite guide grooves 45 function to support the flange portions 11 of the tray 7. In the case where no trays 7 are stored in the storage areas 46, it is possible to bring the carts 8 together as shown in FIG. 12 to reduce the necessary storage space. A reflection plate 47 (see FIG. 7) made of metal is provided on the middle portion of the lower surface of the lower connection member 41 so that the reflection plate 47 can be detected by a position displacement detection sensor 59 that will be described hereinafter.

The tray transfer line 3 is so constructed that a plurality of rollers (not shown) is driven to rotate and convey the tray 7 downstream, i.e., to the tray discharge apparatus 2.

The medicine dispensing apparatus 4 is so constructed that medicines are packed by one dose based on prescription data inputted from a server 78 or the like and dispensed to the tray 7 that is conveyed on the tray transfer line 3. On the lower portion of the medicine dispensing apparatus 4, a stopper (not shown) is provided to stop movement of the tray 7 along the tray transfer line 3 if required.

The card rewriting apparatus 5 is constructed so that predetermined matter can be printed on the identification card 12 provided on the tray 7 and, if already printed, the content can be rewritten and reprinted.

The stack lifter 6 is constructed so that the trays 7, which have been conveyed with the medicine contained therein, can be stacked to put them on standby and then supplied to the tray discharge apparatus 2 sequentially.

The cart transfer apparatus 9 comprises a first cart transfer apparatus 9a for transferring the empty carts 8 aligned on the cart supply line 48 and a second cart transfer apparatus 9b for aligning the carts 8 loaded with trays 7 with the cart discharge line 49. Note, the lines on which the cart transfer apparatus 9b is disposed is shown by the two-dots chain line in FIG. 1.

Each of the cart transfer apparatuses 9a, 9b comprises a drive motor 52 (pulse motor), detection members 53, a control substrate 54, grip members 55 and so on which are provided on a frame 51 supported by four wheels 50. The wheels 50 are rotatably supported on both ends portions of the rotation axes by bearing portions 56. A drive power of the drive motor 52 is transmitted to the rotation axes via drive transmission belt 57. As the detection members 53, cart detection sensors 58 on the middle portions of both sides, a position deviation sensor 59, search sensors 60 and a third optical communication sensor 61 are provided.

Each of the cart detection sensors 58 comprises three juxtaposed optical sensors each having a light emitting element and a light receiving element. A light irradiated from the light emitting element is reflected on the lower surface of the lower connection portion 41 of the cart 8 and is received by the light receiving element so that the lower connecting portion 41 is detected. All of the sensors are disposed so as to simultaneously detect the lower connecting portion 41.

The position deviation sensor 59 is used to detect the reflection plate 47 provided on the cart 8 and decide whether or not the cart 8 is positioned at the center of the cart supply line 48 or the cart discharge line 49, i.e. whether or not the cart 8 deviates from the center in the direction perpendicular to each line.

As the detection sensor 60, an ultrasonic sensor is used for example. The detection sensors 60 are disposed at a total of four places on both sides of the end portions of the cart transport unit 9, respectively, to detect the cart 8. For example, the detection sensor 60 is used when accessing the cart 8 in order to grip the cart 8 by means of the grip member 55 which will be described hereinafter, when detecting the presence or absence of the cart 8, when transporting the gripped cart 8, when detecting whether or not the cart 8 bumps against another cart 8 and so on.

The third optical communication portion 61 conducts data transmission and reception with the first optical communication portion or the second optical communication portion 27 provided on the tray discharge unit 2.

The control substrate 54 controls the pulse signal which will be outputted to the drive motor 52 via the signal converter 63 from the pulse driver 62 based on the data received through the third optical communication portion 61.

Figure 6:
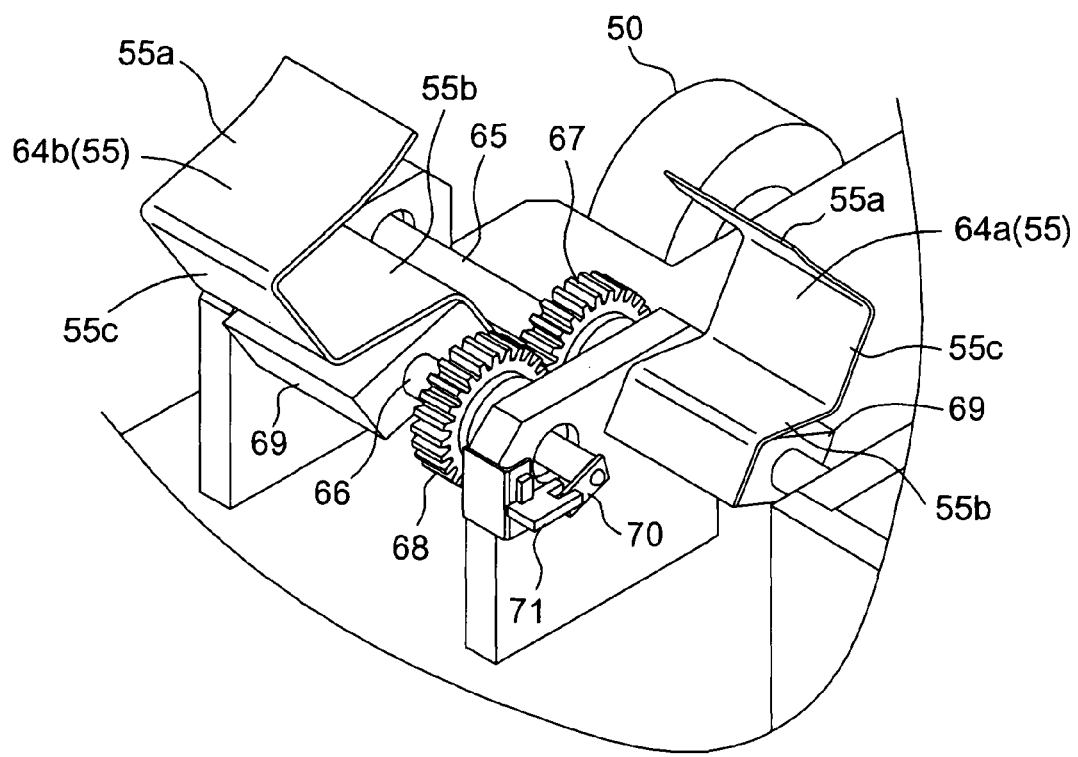
FIG. 6 is an enlarged perspective view showing a grip member provided on the tray transport unit.

Each of the grip members 55, shown in FIG. 6, comprises a pair of grip arms 64a, 64b. The grip members 55 are disposed at the center portion of both sides of the frame 51, i.e.

in the vicinity of each cart detection sensor 58, respectively. One grip arm 64*a* is fixed on the drive shaft 65 which is rotatable forwardly and reversely due to drive of a motor (not shown). The other grip arm 64*b* is fixed on the driven shaft 66. A drive gear 67 provided on the drive shaft 65 and a driven gear 68 provided on the driven shaft 66 are engaged with each other so that the grip arms 64*a*, 64*b* rotate synchronously. Each of the grip arms 64*a*, 64*b* is made of metal plate material bent into an upper plate portion 55*a*, a lower plate portion 55*b* and a side plate portion 55*c* for guiding three surfaces (upper, lower and one of the side surfaces) except the other side surface of the lower connection portion 41 of the cart 8. The upper plate portion 55*a* and the lower plate portion 55*b* are formed so as to expand gradually toward the end from the side plate portion 55*c*, thereby enabling the lower connection portion 41 to be gripped without interference. Also, the grip arms 64*a*, 64*b* are elastically deformable themselves, enabling some deviation to be absorbed and the lower connection portion 41 to be securely gripped. Each of the grip arms 64*a*, 64*b* is attached on support tables 69 of substantially rectangular parallelepiped shape fixed on each of the shafts. The side plate portion 55*c* of one grip arm 64*a* and that of the other grip portion 64*b* can guide the lower connection portion 41 from the side surfaces. Therefore, even if the cart 8 is skewed by a certain degree with respect to the cart transport unit 9, it is possible to correct its position to a proper position. A sensor dog, provided on part of the driven shaft 66, is detected by a grip position detection sensor 71, thereby allowing rotation of the grip arms to be stopped.

Figure 5:
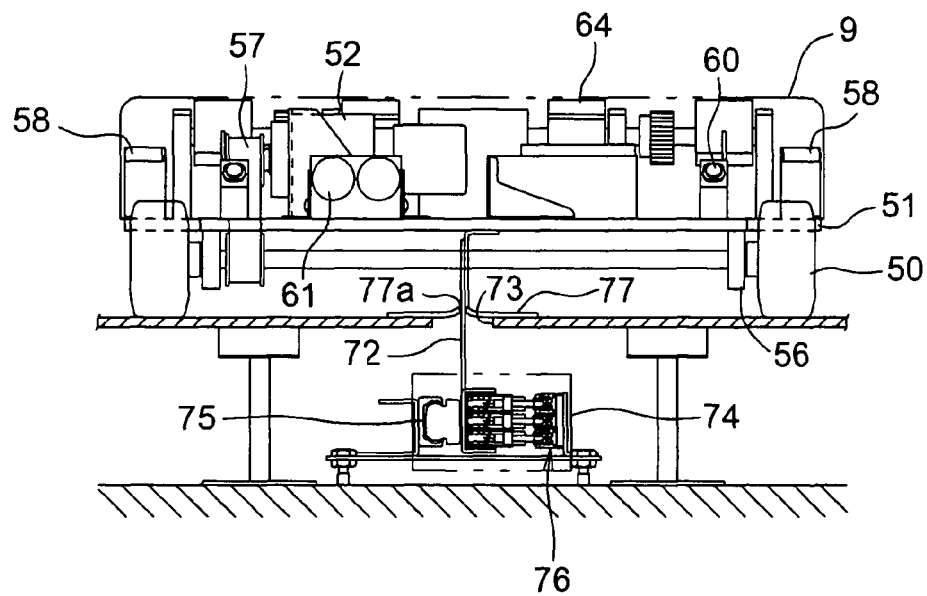
FIG. 5 is a front view showing an internal structure of the tray transport unit and floor.

In the frame 51 of the cart transport unit 9, as shown in FIG. 5, a current collecting arm 72 is provided so as to extend downwardly from the bottom of the cart transport unit. The current collecting arm 72 serves as a power supply path for supplying power to the motor and so on.

On the floor constituting the cart supply line 48 and the cart discharge line 49, as shown in FIG. 5, a slit 73 is formed. A power supply unit 74 is provided beneath the slit 71. In the power supply unit 74, a guide rail 75 and a trolley 76 for power supply are disposed so as to oppose each other. The guide rail 75 can guide the current collecting arm 72 and move the cart transport unit 9 along the line. The trolley 76 supplies power to the cart transport unit 9 via the current collecting arm 72. The upper open portion of the slit 73 is covered by a cover 77 made of flexible material. The cover 77 is formed with a slit 77*a* in which the current collecting arm 72 is movable.

The control unit 10, as shown in FIG. 11, is operable to control the medicine dispensing unit 4, each roller of the tray transport line 3, the tray discharge unit 2 and so on based on prescription data received from a server 78 and so on or inputted by an input unit (for example, keyboard, mouse, touch panel and so on).

Next, the operation of the medicine supply system having the above construction will be described.

Initially, the empty carts 8 are disposed and aligned on the cart supply line 48. That is to say, each of the carts 8 is disposed so that the lower connection portion 41 is orthogonal to the cart supply line 48 and both sides of the lower connection portion 41 is substantially equalized with respect to the cart supply line 48. This arrangement may be not so accurate.

Figure 14:
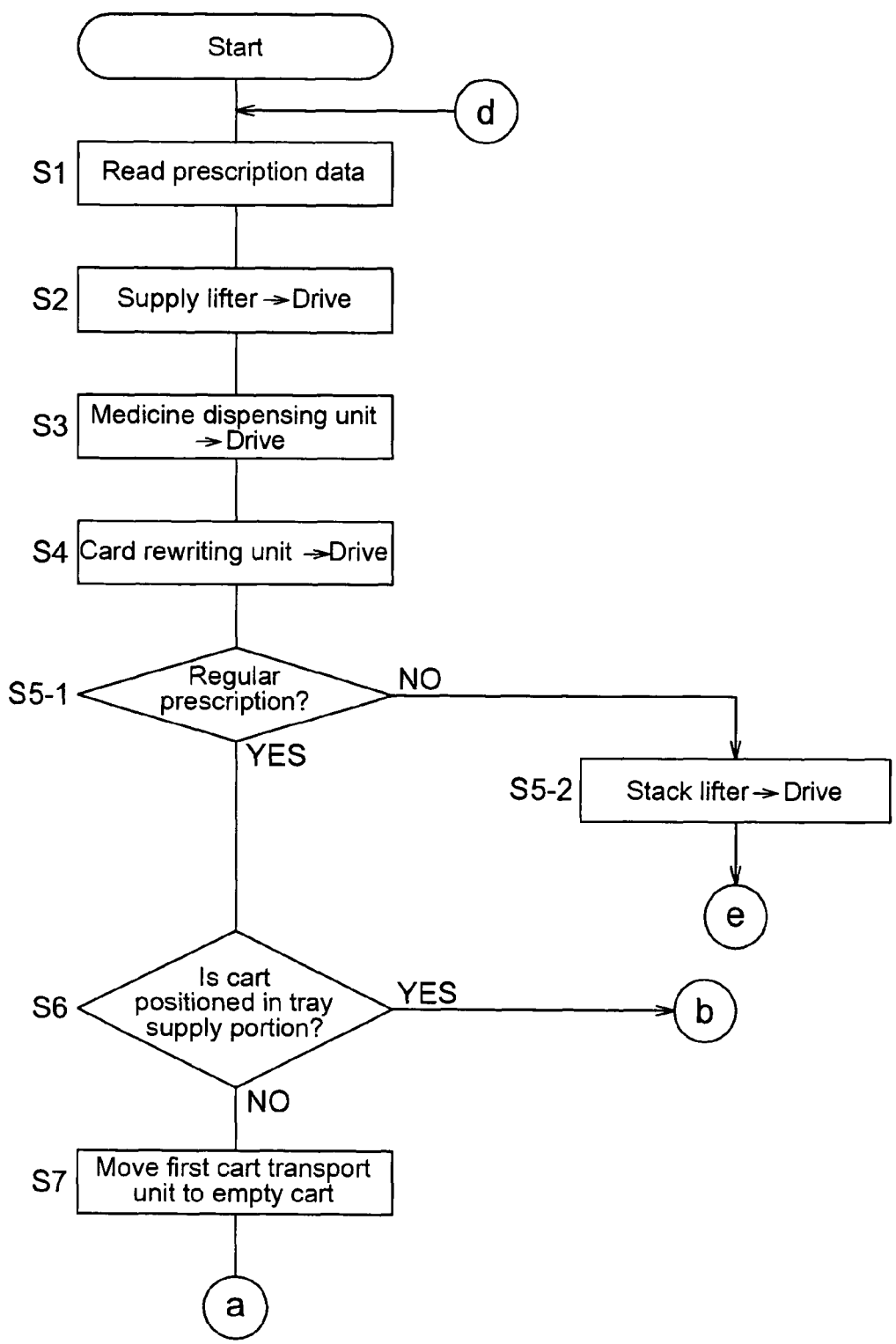
FIG. 14 is a flow chart showing processes in the medicine supply system according to the present invention.
Figure 15:
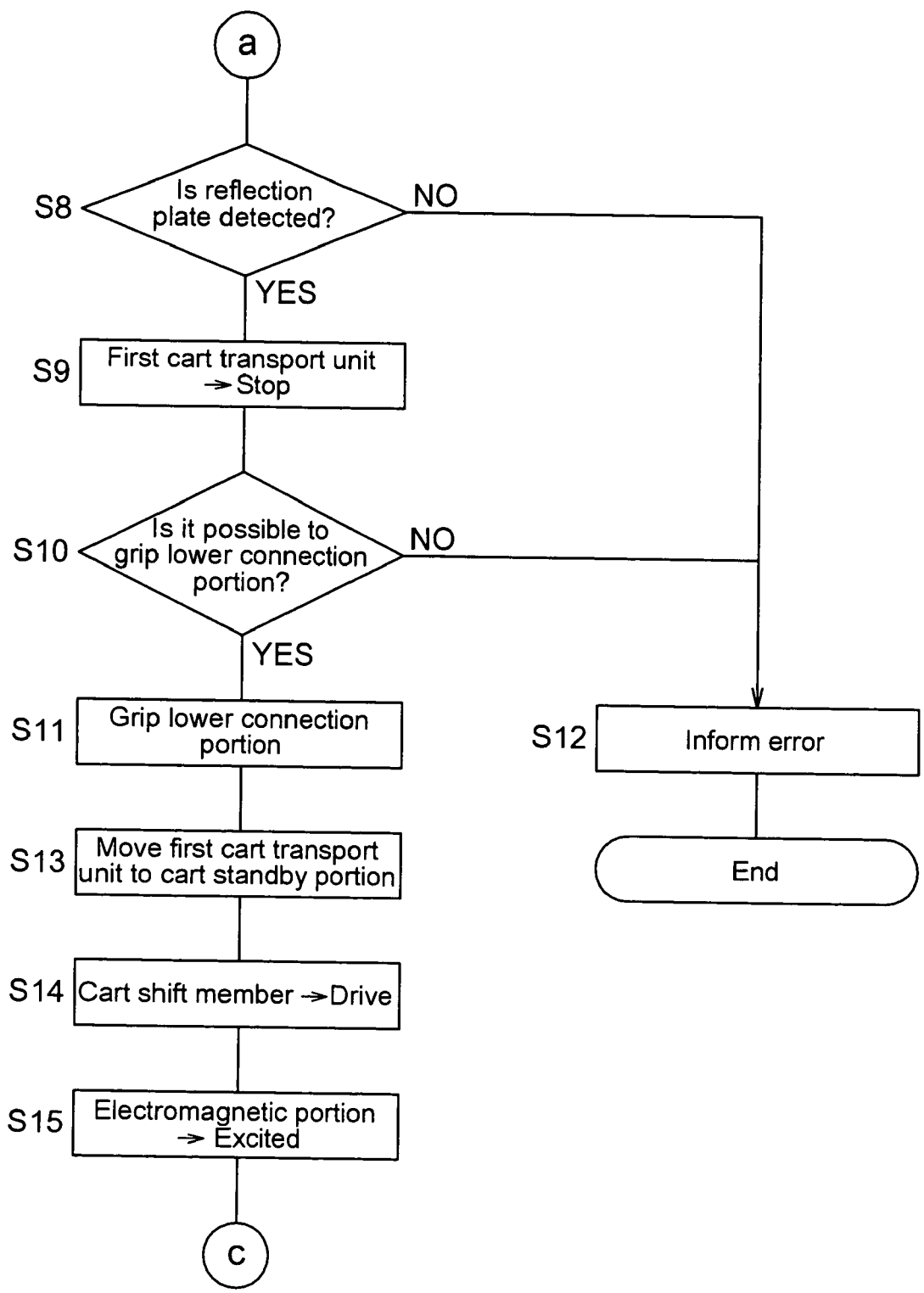
FIG. 15 is a flow chart continued from FIG. 14.
Figure 16:
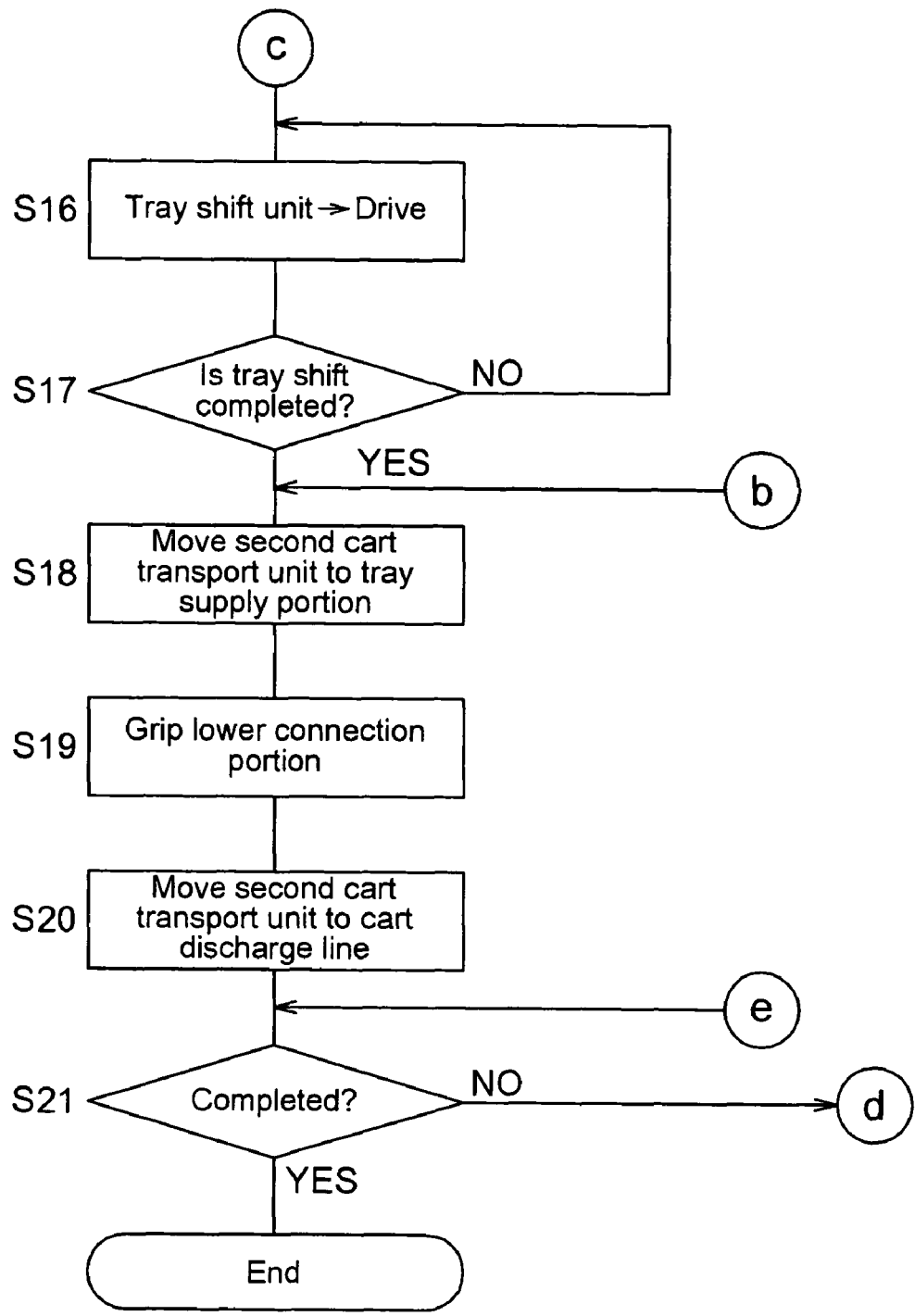
FIG. 16 is a flow chart continued from FIG. 15.

As shown in the flowcharts of FIGS. 14 to 16, based on the prescription data that is inputted from the server 8 and so on (Step S1), the control unit 10 drives the supply lifter 1 (Step S2) to supply the trays 7 to the tray transport line 3. In the tray transport line 3, rollers (not shown) are driven to transport the supplied trays 7 to the medicine dispensing unit 4. When the tray 7 is moved to the medicine dispensing unit 4, which can dispense the medicine indicated in the prescription data, the tray is stopped by a stopper (not shown), which causes the medicine concerned to be discharged. If all of the medicine cannot be dispensed by one medicine dispensing unit 4, the tray 7 is also stopped at another medicine dispensing unit 4 to allow the medicine to be dispensed.

If the medicine is completely dispensed, patient data such as patient name and so on, medicine data such as prescribed medicine name and so on, and address data such as ward name and so on are printed on the identification card 12 attached on the tray 7 by the card rewriting unit 5 (Step S4). If anything is printed, it is rewritten. When printing of the identification card 12 is completed, it is decided whether or not the medicine contained in the tray 7 is a regular prescription (Step S5-1). If it is a regular prescription, the processing is shifted to the next step. If it is determined that the medicine is not the regular prescription but a temporary prescription, the tray 7 is stacked in the stack lifter 6 so as to be able to be taken out (step S5-2). Thus, even in the case of an urgent prescription for a patient whose condition is rapidly changing, it is possible to put the tray on standby in the stack lifter 6 without storing the tray in the cart 8 to promptly cope with the urgency.

In the tray discharge unit 2, the second optical communication portion 27 of the tray supply portion 14 communicates with the third optical communication portion 61 of the second cart transport unit 9*b*. It is determined based on the detection result of the detection sensor 60 of the second cart transport unit 9*b* whether or not the cart 8 is positioned at the tray supply portion 14 (Step S6). If the cart 8 is not positioned at the tray supply portion 14, the first optical communication portion 16 of the cart standby portion 13 communicates with the third optical communication portion 61 of the first cart transport unit 9*a* and the first cart transport unit 9*a* is moved to the empty cart 8 closest to the tray discharge unit 2 based on the detection result of the detection sensor 60 of the first cart transport unit 9*a* (Step S7). If the cart 8 is positioned at the tray supply portion 14, the processing is shifted to Step S18 which will be described hereinafter.

In this case, the first cart transport unit 9*a* is moved at a high speed until it is determined by the detection sensor 60, positioned at the side of moving direction of the first cart transport unit 9*a*, that the first cart transport unit 9*a* approaches the cart 8 by a predetermined distance. When it is determined that the first cart transport unit 9*a* approaches the cart 8 by a predetermined distance, the speed is deduced. In detail, the first cart transport unit 9*a* is moved at a high speed (constant speed) until the distance to the cart 8 becomes a first set distance; and if the distance has reached the first distance, the moving speed of the first cart transport unit 9*a* is decelerated by one-fourth. When the distance to the cart 8 becomes a second set distance, which is smaller than the first set distance, the moving speed is further decelerated by one-sixth with respect to the moving speed at the high speed.

When a predetermined time has passed while the position deviation detection sensor 59 does not detect the reflection plate 47 (Step S8; NO), it is determined that the position of the cart 8 has deviated in the direction perpendicular to the cart supply line 48 and an error is informed (Step S12).

When the position deviation detection sensor 59 detects the reflection plate 47 (Step S8; YES), the first cart transport unit 9*a* is stopped (Step S9). Then, it is determined based on the detection signal of the cart detection sensor 58 whether or not a gripping operation of the grip members 55 is possible (Step S10). This decision is conducted in accordance with whether or not at least two optical sensors of each cart detection sensor 58 positioned at both sides of the cart transport unit 9*a* emit a detection signal.

If it is decided that gripping operation of the grip members 55 is possible (Step S10; YES), the motor (not shown) is driven to rotate the grip arms 64a, 64b to grip the lower connection portion 41 (Step S11). At this time, the lower connection portion 41 is guided as both side surfaces are pushed by the side plate portions 55c of each of the grip arms 64a, 64b, allowing the position of the cart to be corrected even if the cart is positioned so that the lower connection portion 41 is skewed to a certain degree with respect to the direction perpendicular to the cart supply line 48.

If it is determined that a gripping operation of the grip members 55 is impossible, that is to say, the skewed angle of the lower connection portion 41 with respect to the direction perpendicular to the cart supply line 48 is too large for the grip arms 64a, 64b to grip the lower connection portion 41 (Step S10; NO), an error is informed (Step S12).

If the lower connection portion 41 is held by the grip arms 64a, 64b, the first cart transport unit 9a is moved to the cart standby portion 13 of the tray discharge unit 2 (Step S13). Even when moving to the cart standby portion 13, the first cart transport unit 9a is moved at a high speed until the unit approaches to a certain distance; and if the unit has approached the certain distance, the unit is stopped or the speed is decreased. In detail, the first cart transport unit 9a is moved at the high speed until the distance to the cart standby portion 13 becomes a first set distance; the moving speed is then decelerated by one-sixth until the distance becomes a second set distance from the first distance; and when the distance becomes the second distance, the unit is stopped. At this time, the pusher 34 of the cart shift member 15 is moved to the end portion of the cart standby portion 13. Also, the guide piece 20 of the guide member 17 is elevated to prepare for moving the cart 8 to the cart standby portion 13. Moving the pusher 34 and elevating the guide piece 20 are conducted provided that the preceding cart 8 is not positioned at the cart standby portion 13. Thus, failure caused by the carts 8 colliding against each other is prevented.

The first transport unit 9a is further driven to move the empty cart 8 to the cart standby portion 13 based on the detection signal of the detection sensor 60. At this time, the pulse number of the applied voltage to the drive motor 52 is controlled so as to adjust the distance to a distance calculated based on the detection signal of the detection sensor 60.

When the empty cart 8 is positioned at the cart standby portion 13, the guide piece 20 of the guide member 17 is lowered to prevent the cart 8 from deviating at the time of shifting the cart 8. Also, the gripping state of the grip member 55 is released and the first cart transport unit 9a is retreated from the empty cart 8. It is determined based on the detection result of the detection sensor 60 obtained from communication between the second optical communication portion 27 and the third optical communication portion 61 whether or not the cart 8 is positioned at the tray supply portion 14. If no cart 8 is positioned at the tray supply portion 14, the pusher 34 of the cart shift member 15 is moved so that the empty cart 8 is moved to the tray supply portion 14 from the cart standby portion 13 (Step S14). The empty cart 8 is moved while it is prevented by the guide member 17 (guide piece 20 and guide roller 30) and the guide cover 31 from moving laterally.

When the cart 8 is moved to the tray supply portion 14, the electromagnetic portion 28 is excited to attract and position the cart 8 (Step S15). Then, the tray shift unit 21 is driven to continuously store the medicine containing trays 7 in the storage area 46 (Step S16). As the cart 8 is positioned by the electromagnetic portion 28 and guided by the guide roller 30, the cart is never displaced during the storage work of the trays 7.

The position of the storage area 46 in which the trays 7 are stored can be set, for example, as shown in FIGS. 13(a) to 13(c).

FIG. 13 (a) shows an example in which the trays 7 are stored from 1st to 12th in order of the receipt number of the prescription data accepted by the server 78. FIG. 13 (b) shows an example in which storage stages are different by the hospital wards. The trays A-1 to A-5 for the hospital ward A are stored in the first and second stages; the trays B-1 and B-2 for the hospital ward B are stored in the third stage; and the trays C-1 to C-3 for the hospital ward C are stored in the fourth stage. FIG. 13(c) shows an example in which the storage rows are different by the hospital wards. In this case, differentiating the colors of trays 7 by the hospital wards is preferable in that the operator can easily discriminate them. In the case of cart 8, as shown in FIG. 8, the guide grooves 45 are provided with a half pitch with respect to the storage space of the tray 7, it is possible to store the trays 7 in the stages shifted by a half pitch, thereby allowing the trays to be discriminated by the hospital wards. If number of guide grooves 45 is increased, it is possible to provide the trays 7 with various pitches such as one-third pitch with respect to the storage space of the tray 7.

When the storage work of the trays 7 into the cart 8 is completed (Step S17: YES), the second cart transport unit 9b is driven through the second optical communication portion 27 of the tray supply portion 14 and the third communication portion 61 of the second cart transport unit 9b to move the cart 8 to the tray supply portion 14 (Step S18). For example, in the storage pattern of FIG. 13(b), if the delivery address (ward) data of the next tray is different from that of the previous tray, the control unit 10 stores the tray in the storage area of the next stage. If no next stage is present, a tray storage completion signal is transmitted to the third optical communication portion 61 of the second transport unit 9b via the second optical communication portion of the tray supply portion 14. When the second communication portion 61 receives the tray storage completion signal, the second tray transport unit 9b moves the cart 8 to the tray supply portion 14. Then, the lower connection portion 41 of the cart 8 positioned at the tray supply portion 14 is gripped by the grip arm 64 of the grip member 55 (Step S19). Subsequently, the electromagnetic portion 28 is demagnetized to release the attracted state of the cart 8. After that, the guide roller 30 is elevated to allow the cart 8 to move to the cart discharge line 49. Then, the second cart transport unit 9b is driven to move the cart to a predetermined position on the cart discharge line 49 (Step S20).

In a similar way, the empty cart 8 of the cart supply line 48 is transported, to the tray discharge unit 2 by the cart transport unit 9. After the trays 7 are stored, the cart 8 is moved to the cart discharge line 49. In the cart discharge line 49, the carts 8 may be disposed at even intervals, though it is possible to dispose the carts 8 at different intervals in accordance with the transport address of the carts 8. For example, if there are three carts 8 to be transported to hospital ward A, these carts are disposed at even intervals. Subsequently, if there are two carts 8 to be transported to hospital ward B, these carts can be disposed at even intervals and with at a large distance to the group of carts 8 to be transported to hospital ward A. This allows the operator to easily discriminate the carts 8 during transportation to each of the hospital wards, which would be convenient.

Thereafter, with respect to all of the prescription data inputted in the control unit 10, when the operations of dispensing the medicine to the trays 7 and storing the trays 7 in the cart 8 are completed (Step S21: YES), the processing is terminated. If not completed (Step S21: NO), the processing is returned to Step S1 to repeat the same processing.

The above-described processing is effective in a case in which the medicines are contained in the trays 7 and the trays 7 are stored in the cart 8 at night or so.

In the above embodiment, the cart transport unit 9 is provided with the detection sensors 55, though it is also preferable to further provide a vibration sensor. Even if the detection sensors 55 are unable to detect any obstacles, the vibration sensor detects vibration generated when the cart transport unit 9 collides with the obstacle. Based on the vibration, an error is informed and the cart transport unit 9 is stopped. This more reliably prevents any problems that would be caused during movement of the cart transport unit 9.

The invention claimed is:

1. A tray discharge apparatus for storing trays with medicine contained in each of storage areas provided in a cart, the apparatus comprising:
    a cart standby portion for putting a cart, which has been transported from a cart supply line, on standby;
    a tray supply portion having a tray shift unit for sequentially storing trays with medicine contained therein in each of storage areas of a cart transported from the cart standby portion, the tray supply portion aligning the carts with the trays stored therein with a cart discharge line that is juxtaposed with the cart supply line; and
    a cart shift member for moving the cart to the tray supply portion from the cart standby portion, the cart shift member comprising a pusher for pushing an upper end member of the cart,
    wherein the cart standby portion is provided with a first guide portion comprising a guide member that ascends when the cart is moved to the cart standby portion from the cart supply line and descends to guide the upper end member of the cart when the cart is moved to the tray supply portion from the cart standby portion;
    wherein the tray supply portion is provided with a second guide portion comprising a guide member that descends to guide the upper end member of the cart when the cart is moved to the tray supply portion from the cart standby portion and ascends when the cart is moved to the cart discharge line from the tray supply portion; and
    wherein a third guide portion is provided between the cart standby portion and the tray supply portion, the third guide portion being adapted to guide the upper end member of the cart.

2. The tray discharge apparatus as in claim 1, wherein the tray supply portion is provided with an electromagnetic portion for attracting and positioning the cart moved from the cart standby portion, and
    wherein the apparatus further comprises a control portion which drives the cart shift member to move the cart to the tray supply portion from the cart standby portion and then magnetizes or demagnetizes the electromagnetic portion.

3. The tray discharge as in claim 1, wherein the guide member of the second guide portion is a guide roller.

4. The tray discharge as in claim 1, wherein the third guide portion is an L-shaped body that includes a horizontal section and a vertical section extending downwardly from the horizontal section.

* * * * *